US 6,724,908 B2

(12) United States Patent
Fukuyama

(10) Patent No.: US 6,724,908 B2
(45) Date of Patent: Apr. 20, 2004

(54) METHOD FOR PRODUCING ELECTRIC-MECHANICAL ACOUSTIC CONVERTER

(75) Inventor: Takanori Fukuyama, Hisai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/384,835

(22) Filed: Mar. 10, 2003

(65) Prior Publication Data
US 2003/0169895 A1 Sep. 11, 2003

Related U.S. Application Data

(62) Division of application No. 09/331,902, filed as application No. PCT/JP98/04904 on Oct. 29, 1998, now Pat. No. 6,570,993.

(30) Foreign Application Priority Data

Oct. 30, 1997 (JP) .............................. 9-298276
Jun. 30, 1998 (JP) ........................... 10-183736

(51) Int. Cl.$^7$ .............................. H04R 25/00
(52) U.S. Cl. .................. 381/396; 381/412; 29/594; 340/388.1
(58) Field of Search ............... 381/151, 396, 381/398, 412, 353, 354, 409, 410; 29/594; 340/388.1, 7.6, 7.62, 7.63

(56) References Cited

U.S. PATENT DOCUMENTS

| 5,107,540 | A |   | 4/1992 | Mooney et al. |
| 5,327,120 | A |   | 7/1994 | McKee et al. |
| 5,528,697 | A | * | 6/1996 | Saito ........................... 381/396 |
| 5,581,623 | A | * | 12/1996 | Ishimura et al. ............ 381/396 |
| 5,956,622 | A | * | 9/1999 | Lee ............................. 381/396 |
| 6,097,828 | A | * | 8/2000 | Suzuki et al. ............... 381/409 |
| 6,208,237 | B1 |  | 3/2001 | Saiki et al. |

FOREIGN PATENT DOCUMENTS

| JP | 9-261917 | 10/1997 |
| JP | 9-267075 | 10/1997 |

* cited by examiner

Primary Examiner—Huyen Le
(74) Attorney, Agent, or Firm—RatnerPrestia

(57) ABSTRACT

The present invention relates to an electric-mechanical-acoustic converter used mainly in a mobile telephone and the like, and its objective is to provide a high-quality product in which damage and degradation of performance caused by shock due to a drop are prevented. In order to achieve this objective, the present invention includes at least one suspension (14) supporting a movable portion (19) formed of the magnetic circuit portion (17) and a weight portion (13), and a frame (9) supporting a diaphragm (8) and the suspension (14), a space in an elastic deformation range of the suspension (14) being provided between the outer periphery of the movable portion (19) and the frame (9). Even in the case where a portable terminal apparatus is dropped, and the electric-mechanical-acoustic converter built therein is subjected to shock, the outer periphery of the movable portion (19) is received by the frame (9), whereby the suspension (14) can be prevented from being permanently deformed.

1 Claim, 4 Drawing Sheets

PRIOR ART

METHOD FOR PRODUCING ELECTRIC-MECHANICAL ACOUSTIC CONVERTER

This application is a divisional of U.S. patent application Ser. No. 09/331,902 filed Aug. 16, 1999 which is the U.S. National Phase Application of PCT International Application PCT/JP98/04904, now U.S. Pat. No. 6,570,993.

TECHNICAL FIELD

The present invention relates to an electric-mechanical-acoustic converter for vibrating or generating a sound with an electric signal, and a method for producing the same.

BACKGROUND ART

Conventionally, in a portable terminal apparatus such as a mobile telephone, as means for notifying an incoming call, a small sound generator which generates a bell sound and a micromotor in which a weight is eccentrically attached to a rotation axis so as to cause vibration have been used as separate functional components. Furthermore, in order to listen to a conversation of a person on the other end of the line, it is required to attach a speaker for receiving a conversation.

FIG. 6 is a cross-sectional side view of an electric-mechanical-acoustic converter used in the above-mentioned portable terminal apparatus. The background art will be described with reference to this figure. In order to achieve further miniaturization and lighter weight of a portable terminal apparatus, the electric-mechanical-acoustic converter in FIG. 6 achieves both sound generation and vibration so as to reduce the number of components.

Referring to FIG. 6, an outer peripheral portion a circular diaphragm 1 is attached to a case 2. The case 2 has a bottom plate 5, and a yoke 3 is fixed to the bottom plate 5. A suspension 6 is supported by the case 2, and a magnet 4 is supported by the suspension 6. A voice coil 7 consisting of a bobbin and a coil both ends of which are connected to a terminal (not shown) to which an electric signal is input from outside is inserted in a magnetic gap formed by an inner peripheral surface of the yoke 3 and an outer peripheral surface of the magnet 4, and one end of the voice coil 7 is fixed to the diaphragm 1.

The yoke 3 and the magnet 4 form a magnetic circuit portion and the suspension 6 and the magnet 4 form a mechanical vibration system.

Next, the operation will be described. In the above-mentioned electric-mechanical-acoustic converter, an action-reaction force works between the voice coil 7 and the magnetic circuit portion, when an electric signal is applied to the voice coil 7 from outside. Suppose that a force applied to the voice coil 7 is an action force, the diaphragm 1 to which the voice coil 7 is attached vibrates due to the action force.

Furthermore, due to the reaction force applied to the magnetic circuit portion, the magnet 4 supported by the suspension 6 vibrates, and vibration is transmitted to the case 2 through the suspension 6, whereby the case 2 vibrates. The resonance frequency of the magnetic circuit portion is in a low band. Therefore, an electric signal at a frequency in this low band is applied to the voice coil, whereby outstanding vibration can be obtained.

However, there is a possibility that the portable terminal apparatus such as a mobile telephone is dropped while being carried due to its portability, and there is a possibility that an electric-mechanical-acoustic converter built in the portable terminal apparatus will be deformed and damaged by the shock caused by such a drop.

The present invention solves the above-mentioned problem, and its objective is to provide an electric-mechanical-acoustic converter which has outstanding resistance to shock and in which the resonance frequency of vibration is stabilized.

The entire disclosure of U.S. patent application Ser. No. 09/331,902 filed Aug. 16, 1999, is expressly incorporated by reference herein.

DISCLOSURE OF THE INVENTION

In order to solve the above-mentioned problem, the electric-mechanical-acoustic converter of the present invention includes a diaphragm, a magnetic circuit disposed so as to oppose the diaphragm, a voice coil one end of which is attached to the diaphragm and which is inserted into a magnetic gap of the magnetic circuit with a predetermined space, a weight integrated with the magnetic circuit or attached thereto as a separate component, at least one suspension supporting a movable portion composed of the magnetic circuit and the weight, and a frame supporting the diaphragm and the suspension, a space in an elastic deformation range of the suspension being provided between the outer periphery of the movable portion and the frame. Even in the case where the portable terminal apparatus is dropped, and the electric-mechanical-acoustic converter built therein is subjected to shock, the outer periphery of the movable portion is received by the frame, whereby the suspension can be prevented from being permanently deformed.

BEST MODE FOR CARRYING OUT THE INVENTION

EXAMPLE 1

Figure 1:
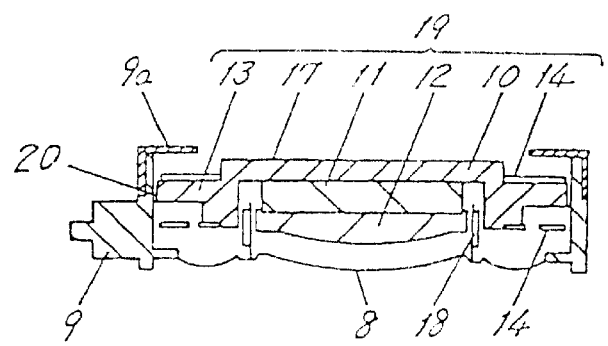
FIG. 1(A) is a cross-sectional side view of an example of an electric-mechanical-acoustic converter of the present invention.
FIG. 1(B) is an exploded perspective view of FIG. 1(A).
Figure 1:
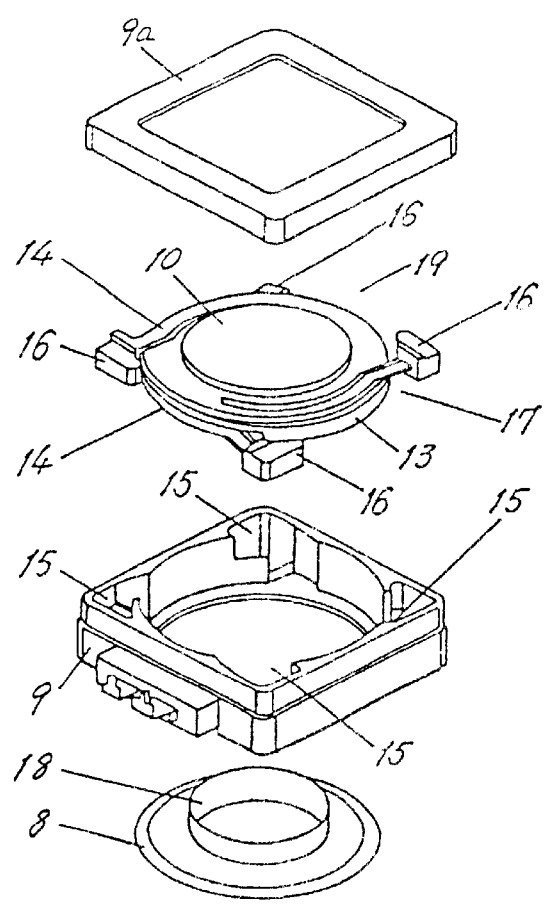

Hereinafter, an example of an electric-mechanical-acoustic converter of the present invention will be described with reference to FIGS. 1(A) and 1(B).

As shown in these figures, reference numeral 8 denotes a diaphragm made of a film with a thickness of about 50 μm, for example, and the diaphragm 8 is attached at an outer periphery to a frame 9 made of resin or the like. Reference numeral 10 denotes a yoke, which has a cylindrical shape having a bottom, made of a ferromagnetic substance such as soft iron. Reference numeral 11 denotes a magnet, which is formed of a permanent magnet of neodymium and has a cylindrical shape. The magnet 11 is fixed to a central portion of the yoke 10. Reference numeral 9a denotes a cover.

Reference numeral 12 denotes a plate made of a ferromagnetic substance, which is fixed to the magnet 11 on the diaphragm 8 side. Reference numeral 13 denotes a weight portion, which is integrated with the yoke 10. Reference numeral 14 denotes suspensions which are composed of two arc-shaped arms extending in a circumferential direction. A pair of the suspensions 14 are provided on upper and lower surfaces of the yoke 10. One end of each suspension 14 is fixed at the weight portion 13, and the other end thereof is molded with resin to be fixed at a concave portion 15 of the frame 9. A connected portion between each suspension 14 and the frame 9 is molded with resin to form a mold portion 16, whereby a fulcrum of each suspension 14 is determined with good precision, and performance thereof is stabilized. When the mold portion 16 is inserted into the concave portion 15 of the frame 9, adhesion strength of the mold portion 16 is also obtained.

The yoke 10, the magnet 11, and the plate 12 form a magnetic circuit portion 17, and an inner surface of the yoke 10 and an outer surface of the plate 12 form a magnetic gap.

A cylindrical voice coil 18 is inserted into the magnetic gap, and one end of the voice coil 18 is attached to the diaphragm 8. The magnetic circuit portion 17 forms a movable portion 19 which is operated relative to the frame 9, and the suspensions 14 and the movable portion 19 form a mechanical vibration system.

A space 20 in an elastic deformation range of the suspensions 14 is provided between an outer periphery of the movable portion 19 and an inner diameter of the frame 9. Furthermore, this space 20 is set to be smaller than the space between the magnetic gap and the voice coil 18. Because of this, even when the movable portion 19 is moved by shock, the inner diameter of the frame 9 receives the outer periphery of the movable portion 19. Therefore, the suspensions 14 return the movable portion 19 to the original position without being permanently deformed. Furthermore, since the outer periphery of the movable portion 19 is received by the frame 9 before the magnetic gap comes into contact with the voice coil 18, the voice coil 18 can be prevented from being damaged.

The operation of the electric-mechanical-acoustic converter thus constructed will be described. When the voice coil 18 receives an electric signal from outside, an action-reaction force works between the voice coil 18 and the magnetic circuit portion 17. Suppose that a force applied to the magnetic circuit portion 17 is a reaction force, the reaction force is supported by the suspensions 14 and is applied to the movable portion 19 composed of the weight portion 13 and the magnetic circuit portion 17, whereby the movable portion 19 vibrates.

In particular, in the case where the frequency of an electric signal applied to the voice coil 18 is identical with a resonance frequency (about 50 to 200 Hz) of the mechanical vibration system, the movable portion 19 largely vibrates. Vibration of the movable portion 19 is transmitted from the suspensions 14 to the frame 9, thereby vibrating the frame 9.

However, when the movable portion 19 performs rolling movements during vibration, the outer periphery of the movable portion 19 may come into contact with the inner diameter of the frame 9 to generate an abnormal sound.

Therefore, in order to prevent this, the suspensions 14 support the center of gravity of the movable portion 19 at a vertically symmetric position (equal distance).

The size of the vibration of the mechanical vibration system is proportional to the product of the mass and an acceleration of the movable portion 19. Thus, when the weight portion 13 is provided in the magnetic circuit portion 17, the mass of the mechanical vibration system is increased, and vibration with a large amplitude can be obtained. When the frame 9 is fixed, for example, in a housing of a portable terminal apparatus, a function of calling or the like can be performed by vibrating the housing. The weight portion 13 is provided mainly at the outer periphery of the magnetic circuit portion 17 which is positioned outside of the minimum cross-sectional area through which a magnetic flux of the magnetic circuit portion 17 passes. Mainly, as described above, in order to increase the mass of the mechanical vibration system, the weight portion 13 is integrated with the magnetic circuit portion 17 or attached thereto as a separate component.

On the other hand, the diaphragm 8 vibrates with an electric signal (having an audible frequency of about 500 Hz or more) applied to the voice coil 18, thereby generating a sound.

Thus, according to the structure of the electric-mechanical-acoustic converter in the present example, vibration performance can be stabilized, and damage to the converter and degradation of performance thereof caused by shock such as a drop can be prevented.

EXAMPLE 2

Figure 2:
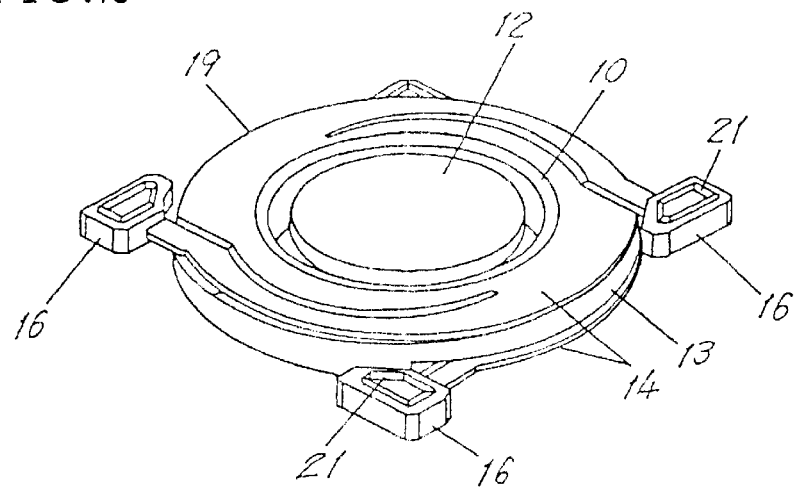
FIG. 2 is a perspective view of an assembly of a movable portion and suspensions which are main portions of another example of an electric-mechanical-acoustic converter of the present invention.

FIG. 2 is a perspective view of an assembly of a movable portion and suspensions which are main portions of another example of an electric-mechanical-acoustic converter of the present invention. In FIG. 2, the identical portions (with those in Example 1) are denoted by the reference numerals identical with those therein. The description thereof is omitted, and only the differences will be described.

Referring to FIG. 2, when one end of each suspension 14 is molded with resin, a rib 21 for welding to the mold portion 16 is simultaneously formed. When the mold portion 16 is welded to the frame 9, each suspension 14 can be connected to the frame 9 within a short period of time. Even in the case where there are a plurality of suspensions 14, the suspensions 14 can be connected to the frame 9 with good precision, simultaneously using an integrated welding jig.

A pair of the suspensions 14 are attached to upper and lower surfaces of the yoke 10 in such a manner that a distance and stiffness are symmetrically distributed in an inverse ratio with respect to the center of gravity of the movable portion 19 in a vertical direction. This prevents the movable portion 19 from performing rolling movements, and prevents an abnormal sound from being generated by the contact between the side surface of the movable portion 19 and the frame 9.

EXAMPLE 3

Figure 3:
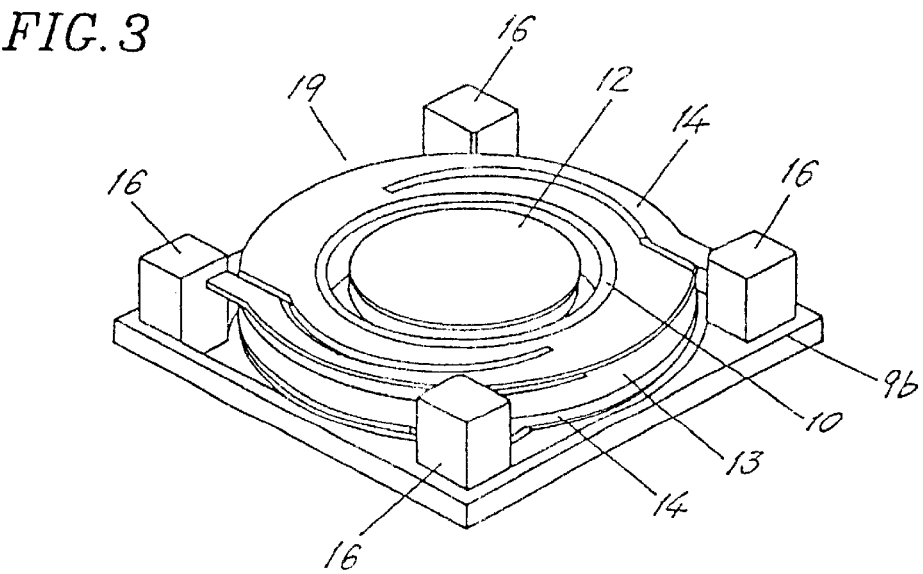
FIG. 3 is a perspective view of an assembly of a movable portion and suspensions which are main portions of still another example of an electric-mechanical-acoustic converter of the present invention.

FIG. 3 is a perspective view of an assembly of a movable portion and suspensions which are main portions of another example of an electric-mechanical-acoustic converter of the present invention. In FIG. 3, the identical portions (with those in Example 1) are denoted by the reference numerals identical with those therein. The description thereof is omitted, and only the differences will be described.

Referring to FIG. 3, a connected portion between the suspensions 14 and the frame 9 is molded with resin, a plurality of fulcrums of the suspensions 14 are integrally molded while the suspensions 14 are previously connected to the movable portion 19, whereby the mold portions 16 are formed. Since a plurality of fulcrums of the suspensions 14 are simultaneously connected with good precision, vibration performance is stabilized.

A frame bottom plate 9b which integrates each mold portion 16 corresponds to the bottom surface of the frame 9 (in Example 1). The frame bottom plate 9b does not have a wall surface, so that the cover 9a is extended downward, or a frame structure is attached.

EXAMPLE 4

Figure 4:
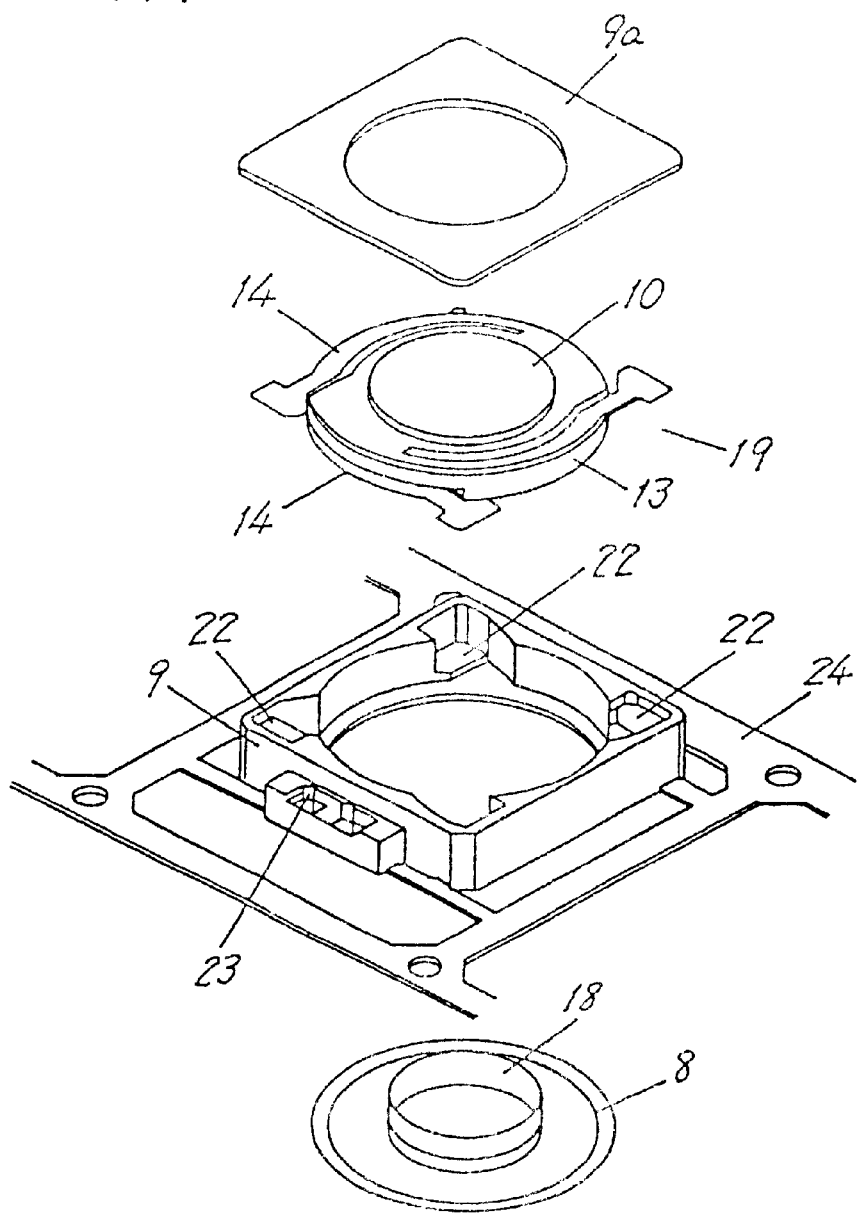
FIG. 4 is an exploded perspective view of still another example in FIG. 3.

FIG. 4 is a perspective view of another example of an electric-mechanical-acoustic converter of the present invention. In FIG. 4, the identical portions (with those in Example 1) are denoted by the reference numerals identical with those therein. The description thereof is omitted, and only differences will be described.

Referring to FIG. 4, a pair of suspensions 14 are provided on upper and lower surfaces of the yoke 10. One end of each suspension 14 is fixed to the dead-end portion 13, and the other end thereof is welded to a metal chip 22 which is insert-molded in the frame 9.

Because of the above, the suspensions 14 can be connected to the frame 9 within a short period of time, and high connection strength can be obtained.

Furthermore, the metal chip 22 and a lead terminal 23 are integrally formed on a lead frame 24, and integrally molded to the frame 9. Due to this, it becomes possible to integrate components and simplify assembly steps.

In the present example, the metal chip 22 and the lead terminal 23 are integrally formed on the lead frame 24. However, one of the suspensions 14 can be integrally formed on the lead frame 24. Furthermore, even in the case of using no metal chip 22, the lead terminal 23 and one of the suspensions 14 can be integrally formed on the lead frame 24. This contributes to the reduction in the number of components and automation of assembly steps.

EXAMPLE 5

Figure 5:
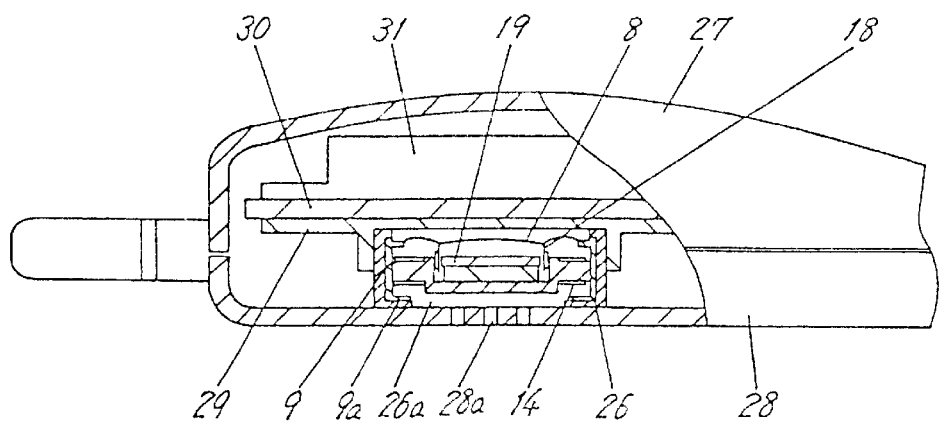
FIG. 5 is a partial cross-sectional side view showing a state where still another example in FIG. 3 is provided in a mobile telephone.
Figure 6:
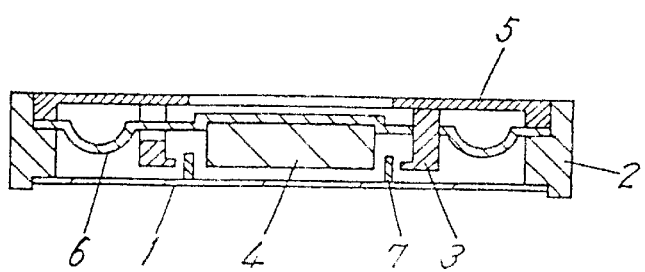
FIG. 6 is a side cross-sectional view of a conventional electric-mechanical-acoustic converter.

FIG. 5 is a partial cross-sectional side view showing a state where an example of an electric-mechanical-acoustic converter of the present invention is provided in a mobile telephone. Only differences (from Example 1) will be described. Reference numeral 26 denotes a bushing made of a rubber-like elastic substance attached so as to cover the frame 9. Reference numeral 27 denotes an upper case of the mobile phone which is a portable terminal. Reference numeral 28 denotes a lower case of the mobile phone. Reference numeral 30 denotes a circuit substrate fixed to the upper case, on which a liquid crystal display portion 31 and electronic components are provided.

Reference numeral 29 denotes a holder fixed to the circuit substrate 30, for accommodating the electric-mechanical-acoustic converter covered with the bushing 26. As is understood from FIG. 5, the electric-mechanical-acoustic converter is attached to the holder 29 in such a manner that the diaphragm 8 is placed on the circuit substrate 30 side.

When the upper case 27 and the lower case 28 are combined to be fixed to each other, the electric-mechanical-acoustic converter is pressure-welded to the mobile telephone via the circuit substrate 30 and the holder 29 (in this case, the electric-mechanical-acoustic converter is designed to be pressure-welded so that an error of each of the above components is absorbed by the bushing 26 which is an elastic substance, and vibration of the electric-mechanical-acoustic converter is transmitted to the body of the mobile telephone without fail).

The bushing 26 is provided with an opening 26a in a portion corresponding to a sound generating portion 28a of the lower case 28. When the diaphragm 8 vibrates to generate a sound, the space between the frame 9 and the movable portion 19 and the opening 26a are allowed to conduct a sound, whereby a sound is generated from the sound generating portion 28a of the lower case 28.

As described above, the electric-mechanical-acoustic converter is attached to the portable terminal so that the diaphragm 8 is placed on the circuit substrate 30 side. Therefore, the voice coil 18 is protected from influence from an outer magnetic field, and a sound generated by the diaphragm 8 can be stably obtained. Furthermore, outer impact is attempted to be absorbed by the bushing 26, and the electric-mechanical-acoustic converter can be pressure-welded to the body of the portable terminal. Therefore, vibration for calling can also be transmitted to the body of the mobile telephone with good efficiency.

The opening 26a may be made of a plurality of small pores or may have a large pore as in the present example.

Furthermore, the bushing 26 will have the above-mentioned effect, even when used in the electric-mechanical-acoustic converter shown in the prior art.

List of Reference Numerals in the Drawings 1 vibration plate
2 case
3 yoke
4 magnet
5 bottom plate
6 suspension
7 voice coil
8 vibration plate
9 frame
9a cover
9b frame bottom plate
10 yoke
11 magnet
12 plate
13 dead-weight
14 suspension
15 concave portion
16 mold portion
17 magnetic circuit portion
18 voice coil
19 movable portion
20 space
21 rib
22 metal chip
23 lead terminal
24 lead frame
26 bushing
26a opening
27 upper case
28 lower case
28a sound generating portion 29 holder
30 circuit substrate
31 liquid crystal display portion

INDUSTRIAL APPLICABILITY

As described above, the electric-mechanical-acoustic converter of the present invention includes: a diaphragm; a magnetic circuit disposed so as to oppose the diaphragm; a voice coil one end of which is attached to the diaphragm, inserted into a magnetic gap of the magnetic circuit with a predetermined space; a weight integrated with the magnetic circuit or attached thereto as a separate component; at least one suspension supporting a movable portion composed of the magnetic circuit and the weight; and a frame supporting the diaphragm and the suspension, a space in an elastic deformation range of the suspension being provided between the outer periphery of the movable portion and the frame. Even in the case where a portable terminal apparatus is dropped, and the electric-mechanical-acoustic converter built therein is subjected to shock, the outer periphery of the movable portion is received by the frame, whereby the suspension can be prevented from being permanently deformed. Furthermore, an outstanding electric-mechanical-acoustic converter for practical use can be provided, which resists degradation of a vibration level caused by damage of the movable portion, variation in a vibration frequency, and a decrease in sharpness of resonance due to damage of a connected portion of the suspension.

Furthermore, (1) in the case where a space between the outer periphery of the movable portion and the inner diameter of the frame is set to be smaller than a space between the magnetic gap and the voice coil, even when the electric-mechanical-acoustic converter is subjected to shock, the outer periphery of the movable portion is received by the frame before the magnetic gap comes into contact with the voice coil, so that the voice coil can be prevented from being damaged.

(2) In the case where the suspension supports the movable portion at a position vertically symmetric with respect to the center of gravity of the movable portion, the suspension supports the center of gravity of the movable portion at a vertically symmetric position, thereby preventing the movable portion from undergoing rolling movements. Thus, an abnormal sound can be prevented from being generated by the contact between the frame and the movable portion due to rolling.

(3) In the case where the suspensions support the movable portion in such a manner that a distance and stiffness are vertically distributed in an inverse ratio with respect to the center of gravity of the movable portion, even when the position of the center of gravity is not placed at an equal distance from the suspensions in a vertical direction, the movable portion can be prevented from undergoing rolling movements. Thus, an abnormal sound can be prevented from being generated by the contact between the frame and the movable portion due to rolling of the movable portion.

Furthermore, the electric-mechanical-acoustic converter of the present invention includes: a diaphragm; a magnetic circuit disposed so as to oppose the diaphragm; a voice coil one end of which is attached to the diaphragm, inserted into a magnetic gap of the magnetic circuit with a predetermined space; a weight integrated with the magnetic circuit or attached thereto as a separate component; at least one suspension supporting a movable portion composed of the magnetic circuit and the weight; and a frame supporting the diaphragm and the suspension, wherein one end of the suspension is molded with resin, and the mold portion is attached to the frame. In this converter, a portion of the suspension attached to the frame is specified, so that a fulcrum of the suspension is determined. Thus, an electric-mechanical-acoustic converter can be provided, in which performance during production is stable. In the case where the mold portion obtained by molding one end of the suspension with resin in the above-mentioned structure is inserted to be fixed in a concave portion provided in the frame, all the portions can be simultaneously assembled with good precision and strength. Furthermore, since a fulcrum of the suspension is molded, vibration characteristics can be prevented from being changed by shock.

Furthermore, the electric-mechanical-acoustic converter of the present invention includes: a diaphragm; a magnetic circuit disposed so as to oppose the diaphragm; a voice coil one end of which is attached to the diaphragm, inserted into a magnetic gap of the magnetic circuit with a predetermined space; a weight integrated with the magnetic circuit or attached thereto as a separate component; at least one suspension supporting a movable portion composed of the magnetic circuit and the weight; and a frame supporting the diaphragm and the suspension, wherein a connected portion of the suspension on the frame side is insert-molded to the frame.

In this converter, the connected portion of the suspension with respect to the frame is integrally molded with resin under the condition that the suspension is connected to the movable portion. Thus, an outstanding electric-mechanical-acoustic converter can be provided, in which assembly can be performed with good precision of a fulcrum of the suspension and positional relationship.

Furthermore, (1) in the case where the connected portion of the suspension on the frame side is welded to a metal chip one end of which is insert-molded to the frame in the above-mentioned structure, assembly can be performed with good precision of a fulcrum of the suspension and positional relationship, and strength can be obtained by welding.

Furthermore, (2) in the case where a metal chip and a lead terminal which receives an electric signal from outside are formed on an identical lead frame, an electric-mechanical-acoustic converter can be produced without increasing the number of components, and assembly steps can be simplified.

Furthermore, the electric-mechanical-acoustic converter of the present invention includes: a diaphragm; a movable portion composed of a magnetic circuit disposed so as to oppose the diaphragm; a voice coil one end of which is attached to the diaphragm, inserted into a magnetic gap of the magnetic circuit; a suspension supporting the movable portion; a frame supporting the diaphragm and the suspension; and an elastic bushing covering the frame, provided with an opening at least on an outside of the movable portion for conducting a sound to a portable terminal, and interposed in the portable terminal. In this converter, the frame is covered with the elastic bushing and the bushing is interposed in the portable terminal. Therefore, in the case where the portable terminal (e.g., a mobile telephone) is dropped, shock caused by the drop is absorbed, and the opening of the bushing conducts a sound to a sound generating portion of the portable terminal, whereby a satisfactory sound can be obtained.

Furthermore, according to the method for producing an electric-mechanical-acoustic converter including: a diaphragm; a magnetic circuit disposed so as to oppose the diaphragm; a voice coil one end of which is attached to the diaphragm, inserted into a magnetic gap of the magnetic circuit with a predetermined space; a weight integrated with the magnetic circuit or attached thereto as a separate component; at least one suspension supporting a movable portion composed of the magnetic circuit and the weight; and a frame which is a housing supporting the diaphragm and the suspension, the suspension and a lead terminal through which an electric signal is applied from outside to the voice coil are formed on a lead frame and integrally molded therewith. Thus, the suspension and the lead terminal are formed on the lead frame, whereby the number of components is reduced, and assembly may be automated.

What is claimed is:

1. A method for producing an electric-mechanical-acoustic converter, said method comprising:

positioning a diaphragm and a magnetic circuit such that the diaphragm opposes the magnetic circuit;

attaching one end of a voice coil to the diaphragm, and inserting the voice coil into a magnetic gap of the magnetic circuit with a predetermined space;

integrating a weight with the magnetic circuit or attaching the weight thereto as a separate component;

supporting a moveable portion composed of the magnetic circuit and the weight with at least one suspension;

supporting the diaphragm and the suspension in a frame, wherein a space in an elastic deformation range of the suspension between an outer periphery of the movable portion and an inner diameter of the frame is smaller than a space between the magnetic gap and the voice coil;

forming on a lead frame and integrally molded therewith, the suspension and a lead terminal through which an electric signal is applied from outside to the voice coil.

* * * * *